United States Patent [19]
Hsieh

[11] Patent Number: 5,839,555
[45] Date of Patent: *Nov. 24, 1998

[54] AUTOMATIC CLUTCH TYPE CHAIN PULLING MECHANISM FOR A MOTOR ROLLING DOOR

[76] Inventor: Tsung-Wen Hsieh, 1st Fl. No. 15, Alley 3, Lane 217 Chung-Hsiao E. Rd., Sec. 3, Taipei, Taiwan

[ * ] Notice: The term of this patent shall not extend beyond the expiration date of Pat. No. 5,579,878.

[21] Appl. No.: 746,123

[22] Filed: Nov. 6, 1996

[51] Int. Cl.[6] .............................. F16D 67/00; E05F 15/00
[52] U.S. Cl. ........................... 192/8 R; 74/625; 160/310; 49/140
[58] Field of Search ................................ 192/7, 8 R, 144; 49/139, 146; 160/310, 7, 189; 74/625; 403/229; 24/116 A, 71 J

[56] References Cited

U.S. PATENT DOCUMENTS

| | | | |
|---|---|---|---|
| 2,110,231 | 3/1938 | McCloud | 74/625 |
| 2,670,065 | 2/1954 | Stevens | 160/310 |
| 2,957,521 | 10/1960 | Greegor | 192/144 |
| 3,134,273 | 5/1964 | Wardlaw | 74/625 |
| 4,782,593 | 11/1988 | Kieser et al. | 192/12 BA |
| 5,203,392 | 4/1993 | Shea | 160/310 |
| 5,579,878 | 12/1996 | Hsieh | 192/8 R |

Primary Examiner—Charles A. Marmor
Assistant Examiner—William C Joyce
Attorney, Agent, or Firm—Bucknam and Archer

[57] ABSTRACT

An automatic clutch type chain pulling mechanism for a motor rolling door for releasing the brake and winding up the door curtain by pulling the chain during electricity cutoff. The chain pulling mechanism is enclosed in a housing and is provided on the rotating shaft of the motor from the outside end inward with a drive block fixed on the rotating shaft of the motor which forms along its circumference a plurality of lugs protruding radially outward, an intermediate disk having an elongated radial slot and formed with a raised circular flange on its circumference with a friction clamping ring inserted within the inner surface of the flange, and a releasing rod mechanism. The releasing rod mechanism includes a brake releasing rod with one end fixed with a pin inserted into the elongated slot and the other end pivoted and having a pair of wing plates inclined upward fixed on the pivoted end for pushing an intermediate lever. The intermediate lever having one end pivoted acts upon an actuating lever fixed integrally with a cam pin of the drum brake assembly. The chain sprocket can be pulled by a chain via external force and is rotatably mounted on the housing. On the inner surface of the chain sprocket, there is a pivotally mounted triggering plate acted upon by a leaf spring, the plate has two lower sides formed with two branch arms for actuating the fixed drive block and a protruding actuating pin fixed on the lower middle part for actuating the friction clamping ring.

6 Claims, 6 Drawing Sheets

AUTOMATIC CLUTCH TYPE CHAIN PULLING MECHANISM FOR A MOTOR ROLLING DOOR

FIELD OF THE INVENTION

The present invention relates to an improved structure of an automatic clutch type chain pulling mechanism for a motor rolling door, in which it is further equipped with a blocking rod for limiting the pulling direction of the chain; a limiting switch for cutting off the recovered current temporarily during manual pulling of the chain; and a chain return device for returning of the triggering plate on chain sprocket so that the operation of the motor rolling door can be more certain and stable.

BACKGROUND OF THE INVENTION

An automatic clutch type chain device for a motor rolling door during electricity cutoff was disclosed in U.S. patent application Ser. No. 08/338,342 by the present inventor, which comprises an intermediate disk actuated by the chain sprocket, an long slide slot of the intermediate disk is slidingly engaged with one end of a brake releasing rod, near the other end of the brake releasing rod being pivoted is fixed with two actuating wing plates inclined upward; an intermediate lever with one end being pivoted can contact at in center part with any one of the wing plates, and with the other end pushing against an actuating lever which can actuates a cam pin of a drum brake assembly. Thus by means of said chain device, the current input to the solenoid valve is cut off by a conventional device such as microswitch when the motor rolling door is closed under normal operation, the plunger of the solenoid valve will be pushed out from the release position of the brake assembly and a return spring inside the black assembly will act on a cam pin to expand two brake shoes of the drum brake assembly for braking the rotating shaft. Thereafter, when the door is to be opened without electricity, the operator simply pulls the chain wound around the chain sprocket, an actuating pin fixed on the chain sprocket will contact a friction ring on the intermediate disk after the chain sprocket rotates for a contain angle, and bring the intermediate disk together for rotation. Having rotated together for a certain angle, a wing plate on the releasing rod will finally push against the intermediate lever due to the fact that the long slide slot on the intermediate disk exerts the brake releasing rod to swing, and the intermediate lever pushes the actuating lever against the spring provided in the drum brake shoes so that the cam pin rotates from the braking position to the brake releasing position, and maintains the brake releasing state so long as the chain being pulled continuously by the operator. When the cam shaft has rotated to the limit, the movement of the intermediate disk, the releasing rod and the actuating lever are blocked and can not be moved anymore. If the operator continues to exert to pull the chain, the friction between the sprocket and the intermediate disk will be exceeded, then the chain sprocket will rotate alone. At this time, a triggering plate provided on the sprocket is deflected to engage with the rotating shaft and then actuates the rotating shaft to rotate. Thus, as long as the operator continues to pull the chain, the braking on the rotating shaft will be released, causing the barrel to rotate and roll up the door curtain opened.

But it has been found in actual practice that although the chain sprocket is loosely fitted in the motor shaft, the rotation of the shaft will more or less cause the sprocket to swing to and fro due to the friction between them during normal electricity operation. The phenomenon is however not ideal though it will not influence the normal operation of the chain sprocket.

In addition, according to the above mentioned structure, when the chain sprocket is operated manually to open the door because of no electricity, if the electricity is charged with, the motor will be restored to its former final set state; thus the strong force of the motor may opposite to the direction of the rolling door being pulled manually. Furthermore, when the rolling door is to be opened, since only one side of the chain can be pulled to open the rolling door, if wrong side is pulled until the rolling door touches the ground, then the operator can be aware of changing to pull the other side of the chain to open the rolling door. Both the above two situations will delay the operation of the chain sprocket, it may consequently obstruct a person from escaping.

According to the above mentioned structure, when the operator begins to pull the chain sprocket, the brake is released first, and then the rotating shaft is rotated. Since the brake is released first, the slates wound around the barrel will due to its own weight have the trend to fall automatically and close the door. If the rolling door to be pulled is somewhat lighter, the trend of falling of the door can be overcome by more force exerted by the operator. However, if the door is so heavy, the rolling door will fall a certain distance before the operator responses to exerts much more force to open the door manually owing to very heavy weight of the curtain of slates.

SUMMARY OF THE INVENTION

In view of the above, the object of the present invention is to provide an improved structure of an automatic clutch chain type chain pulling mechanism for a motor rolling door in order to solve the above problems and make the operation of the rolling door more certain and stable.

That is to say, according to the present invention, the chain sprocket is singly pivoted on a bearing bracket positioned within the housing, and the two sides of the chain surrounded along the sprocket passed out the housing through two outlets on it individually; and a microswitch is further mounted, and can be actuated by the intermediate lever to cut off the power of the motor; a blocking rod is screwed into the housing to point to a predetermined actuating wing plate so that the chain sprocket can be pulled only in the opening-door direction after the door is closed; and a chain duct is fixed on one outlet of the housing along one side of the chain sprocket to pass through the side of chain to be risen. A coil spring is placed inside the duct with its upper end fixed with the duct and with its lower end binding a collect having slit shapes partly. The center part of the collect is formed into a cross guide slot to be a path for the chain to pass through. Thus, when the rolling door is to be risen manually by pulling the chain at one side, the other side of chain is forced against the spring through the collet and starts moving upward only when the force is large enough to compress the spring going forward. The inner diameter of the spring will be enlarged when being compressed, so it looses the tightness of the collect, and the chain therethrough can move freely. That is, by means of the present invention, the operator has to pull the chain violently from the beginning, so that brake releasing and door opening are almost done at the same time. Once the operator stops pulling in the course of pulling the chain, then the spring being pushed will stretch again fiercely and restore its original state. The restoring action causes the chain sprocket rotates backward for a certain angle. The backward rotation of the chain sprocket will make the triggering plate deflected before returned to the original position, because the movement of the triggering plate is in the way of drive blocks fit around the motor shaft and a drive block can touch with triggering plate to turn it.

BRIEF DESCRIPTIONS OF THE DRAWINGS

In order to further understand the above object and effect of the present invention substantially, the present invention will be described with embodiments to the accompanying drawings as below, in which:

FIG. 2-1 is an enlarged exploded perspective view of a collect element and its binding spring in FIG. 2;

DETAILED DESCRIPTION OF THE PREFERRED EMBODIMENTS

Figure 1:
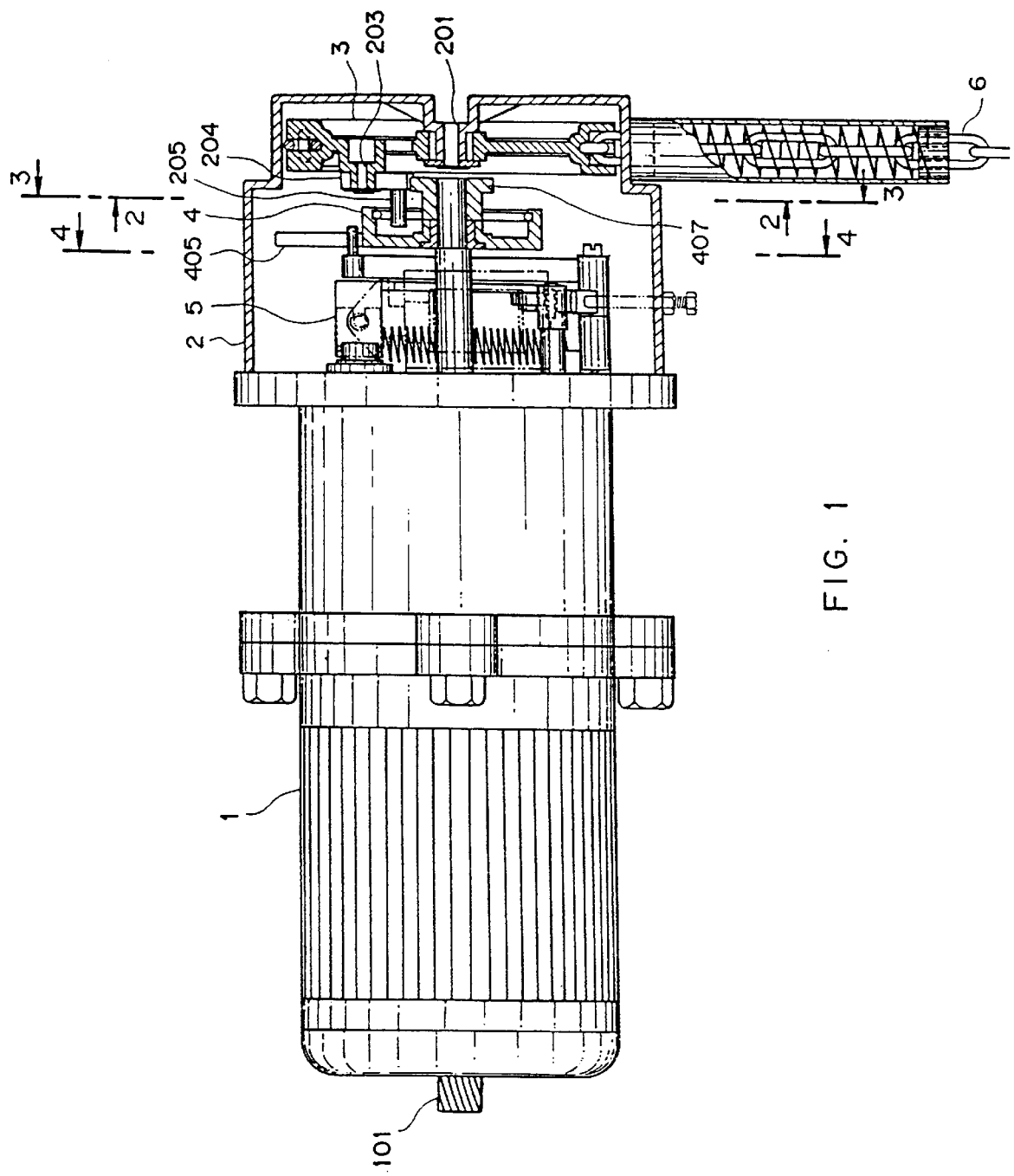
FIG. 1 is a cross sectional view of the present invention, wherein the conventional curtain of slates of rolling door actuated by a motor is omitted.

Please refer to FIG. 1 first, the automatic clutching type chain pulling mechanism for a motor rolling door of the present invention is provided inside a housing 2 fixed to the right side of a motor 1. The left end of a rotating shaft 101 of the motor 1 protrudes out of the motor housing for driving a rotating barrel (not shown) which winds up of a door curtain of slates, and its right end also protrudes out of the motor housing and extends into the housing 2 for a distance. Inside the housing 2 there include from right to left: a chain sprocket 3, an intermediate disk 4, and a brake releasing rod mechanism 5.

Figure 2:
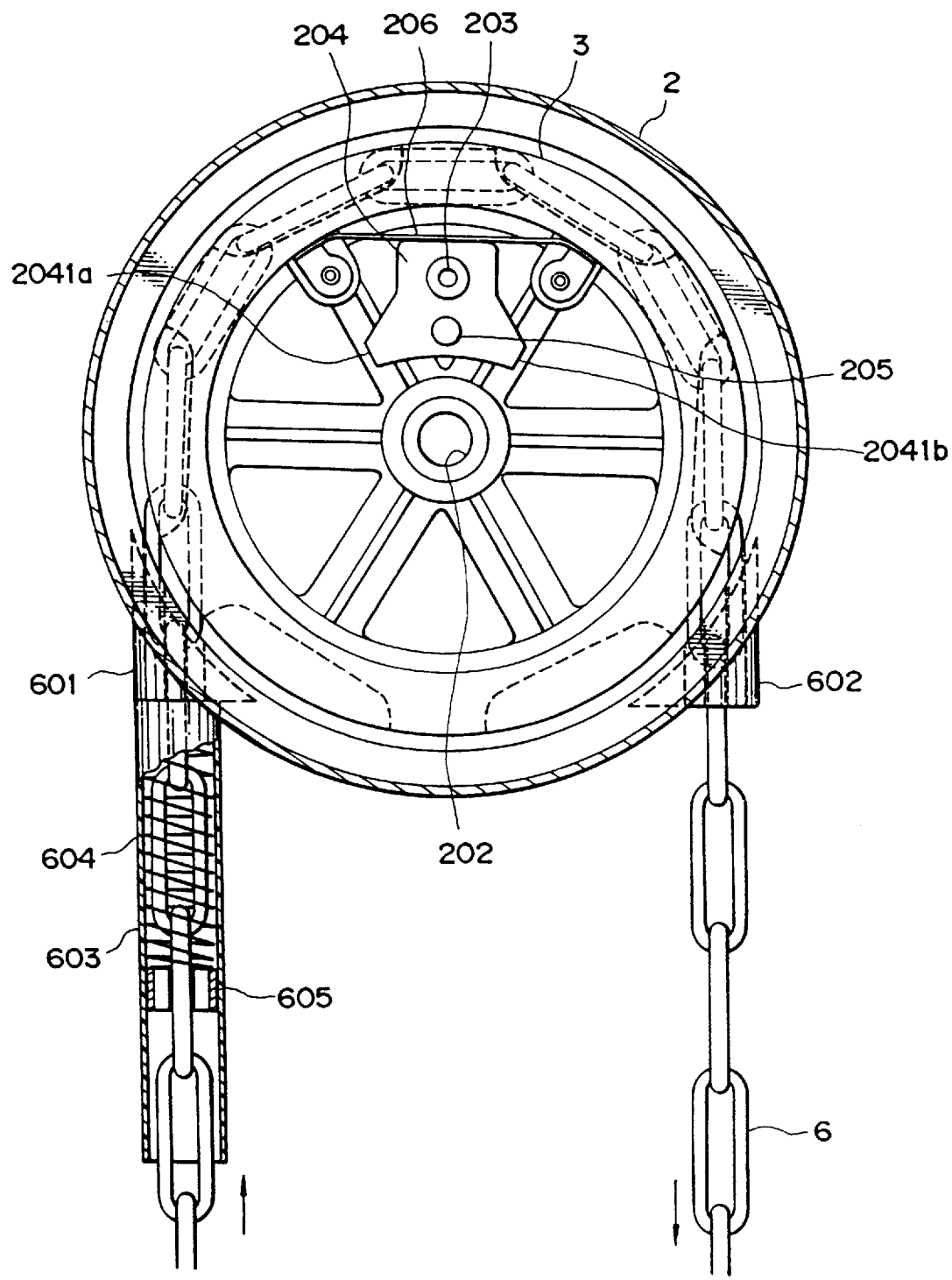
FIG. 2 is a left side view taken along the direction of arrow A—A in FIG. 1.
Figures 1, 2:
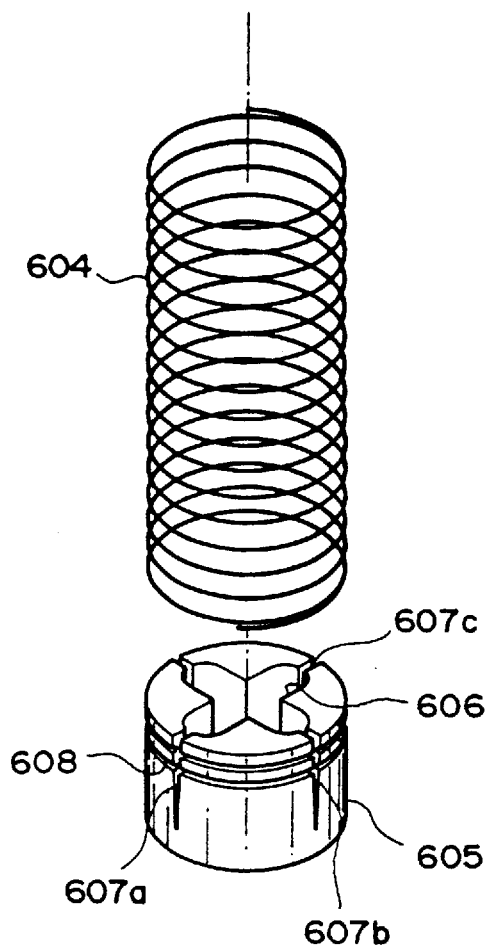

As shown in FIG. 1 and 2, the chain sprocket 3 is pivoted on the bearing 201 inside the housing 2 to rotate freely. A series of chain loop grooves being orthogonal in alternation is provided on the outer surface of the sprocket 3 for accommodating chain rings linked in series of the chain 6 as in a conventional manner, and two sides of the chain 6 run out of the housing 2 through two outlets individually. Thus, by pulling one side of the chain 6, the sprocket 3 can be rotated. Please refer to FIG. 2, which is a left side view of chain sprocket 3 in FIG. 1 taken along the direction of arrow A—A, there is a shaft hole 202 at the center for fitting on a bearing 201 fixed on the inner surface of the housing 2. About the circumference of the chain sprocket 3, a triggering plate 204 is pivoted with a pin 203. Two branch arms 2041a, 2041b are individually at the lower left and right sides of the triggering plate 204, an actuating pin 205 is fixed below the pin 203 protruding away from the sprocket surface 3 for a distance, and the top end of the triggering plate 204 is pushed against with a leaf spring 206.

Please refer to FIG. 2 again, a chain duct 603 is fixed at one of the two outlets 601, 602 of the housing 2 (for example 601) and a long coil spring 604 is provided therein. The upper end of the coil spring 604 is fixed on the duct 603, and the lower end is bound around a ring grove 608 at the circumference of a collet 605. As shown in FIG. 2-1, the collet 605 has a cross guide slot 606 run in axial direction and has a little smaller shape in cross section than the chain 6 when being bound by the spring, and a plurality of slit slots 607a, 607b, 607c . . . are provided radially along the circumference of the collet 605 without axially penetrating through the collet.

Figure 3:
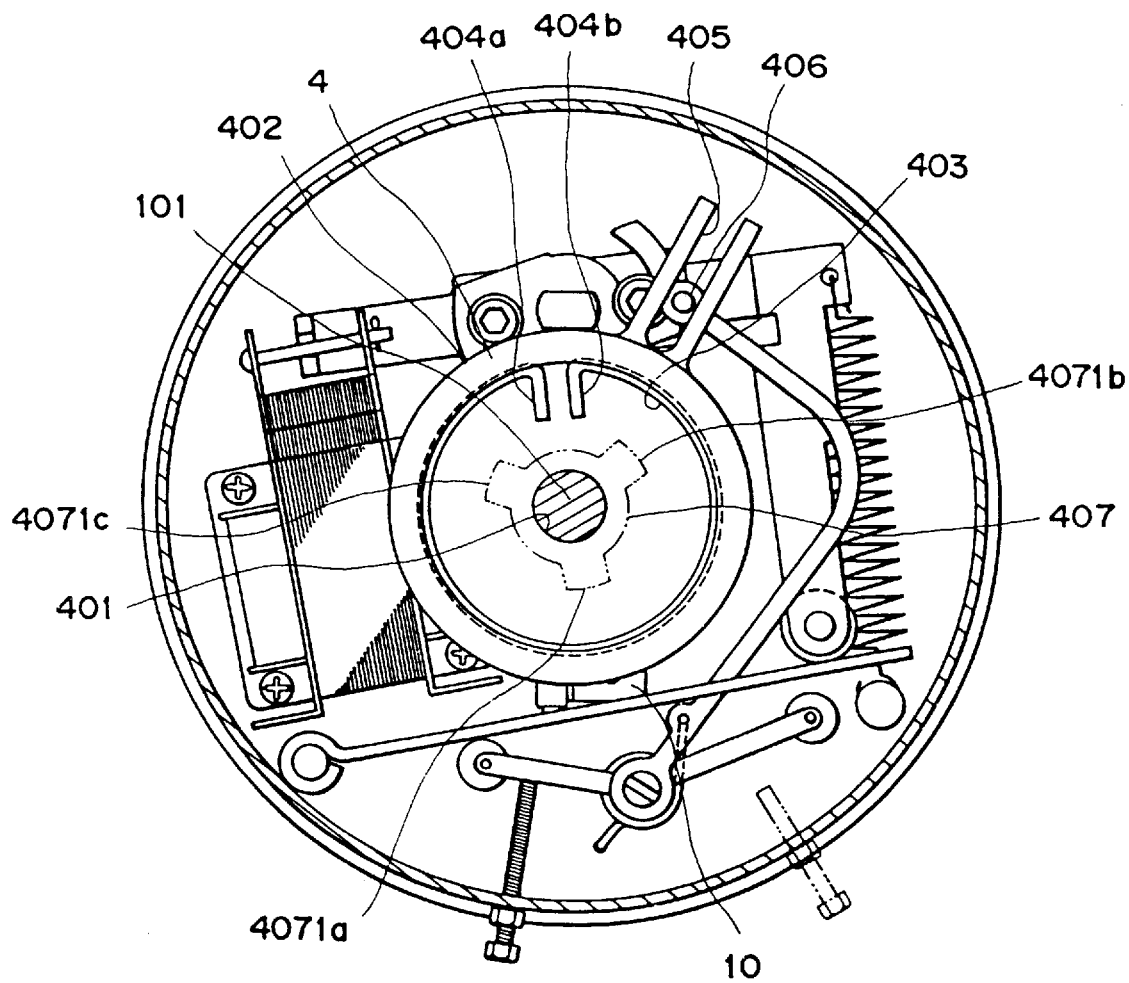
FIG. 3 is a right side view taken along the direction of arrow B—B in FIG. 1.

FIG. 3 is a side view taken along the direction of arrow B—B in FIG. 1, wherein the center of the intermediate disk 4 is provided with a center hole 401 having a larger diameter than the rotating shaft 101 of motor to be loosely engaged therein. A raised flange 402 is provided along the circumference of the intermediate disk 4, and a ring groove is provided on the inner wall of the flange 402 for inserting a friction means, such as a compressible friction clamping ring 403. Two ends of the clamping ring 403 are bent radially inward to form two stopping arms 404a, 404b. When said chain sprocket 3 is fitted on the bearing 201, the moving locus of the actuating pin 205 will be in the protruding height range of the two stopping arms 404a, 404b. Furthermore, a long slide slot 405 is provided radially outward on the circumference of the intermediate disk 4 for accommodating a pin 406. The function of the pin 406 will be explained in detail later. In addition, a drive block 407 is fixed on rotating shaft 101 in front of the flange 402 and has a plurality of lugs 4071a, 4071b, 4071c . . . around its circumference (please refer to FIGS. 1 and 3).

Figure 4:
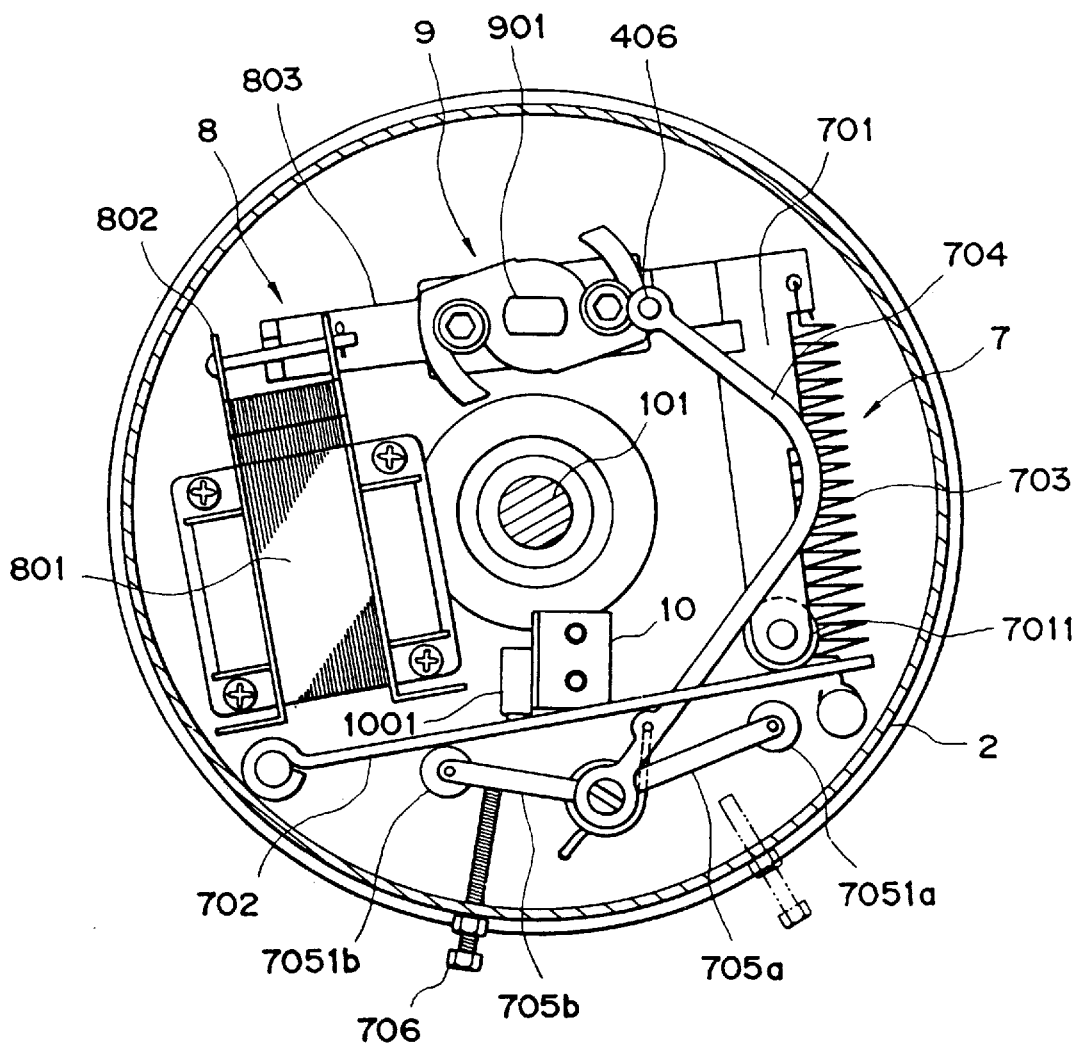
FIG. 4 is a right side view taken along the direction of arrow C—C in FIG. 1.

FIG. 4 shows the brake releasing rod mechanism 7 and the cutoff releasing means 8, taken along the direction of arrow C—C in FIG. 1. The cutoff releasing means 8 is a well known technology, wherein the backward movement of the plunger 802 of the solenoid valve 801 will move the actuating rod 803 and make the cam pin 901 of the conventional brake assembly 9 rotate, so as to release the braking force of brake shoes. The brake releasing rod mechanism 7 of the present invention comprises an actuating lever 701 connected with the extension of the actuating rod 803, the other end of the actuating lever 701 extends downward for some distance, and is pivoted with a roller 7011 at its end; an intermediate lever 702, its one end being pivoted, with the other end being always abutted against the end of the actuating lever 701 by means of a spring 703; a brake releasing rod 704 is pivoted at one end below the center part of the intermediate lever 702 and connected with a pair of wing plate 705a, 705b inclined upward, and the other end of the brake releasing rod 704 is bent upward with the end being fixed with the pin 406 for inserting into the long slide slot 405 on the intermediate disk 4.

Two rollers 7051a, 7051b are individually mounted on the ends of the two wing plates 705a, 705b; and a screw rod 706 is screwed into any one screw hole penetrating the housing 2 and pointed to the two wing plates 705a, 705b such that the front end of the screw rod 706 can push against a selected wing plate, its function will be explained later. In addition, a microswitch 10 is further fixed above the intermediate plate 702. When the intermediate lever 702 moves upward, the actuating arm 1001 of the microswitch 10 will push against the upper surface of the intermediate lever 702. The connections in the microswitch 10 are in the way that when the actuating arm 1001 is pushed, the current flowing into the motor 1 will be cut off. Since the circuit of the microswitch is a conventional technology, thus it will not be described further in detail.

Figure 5:
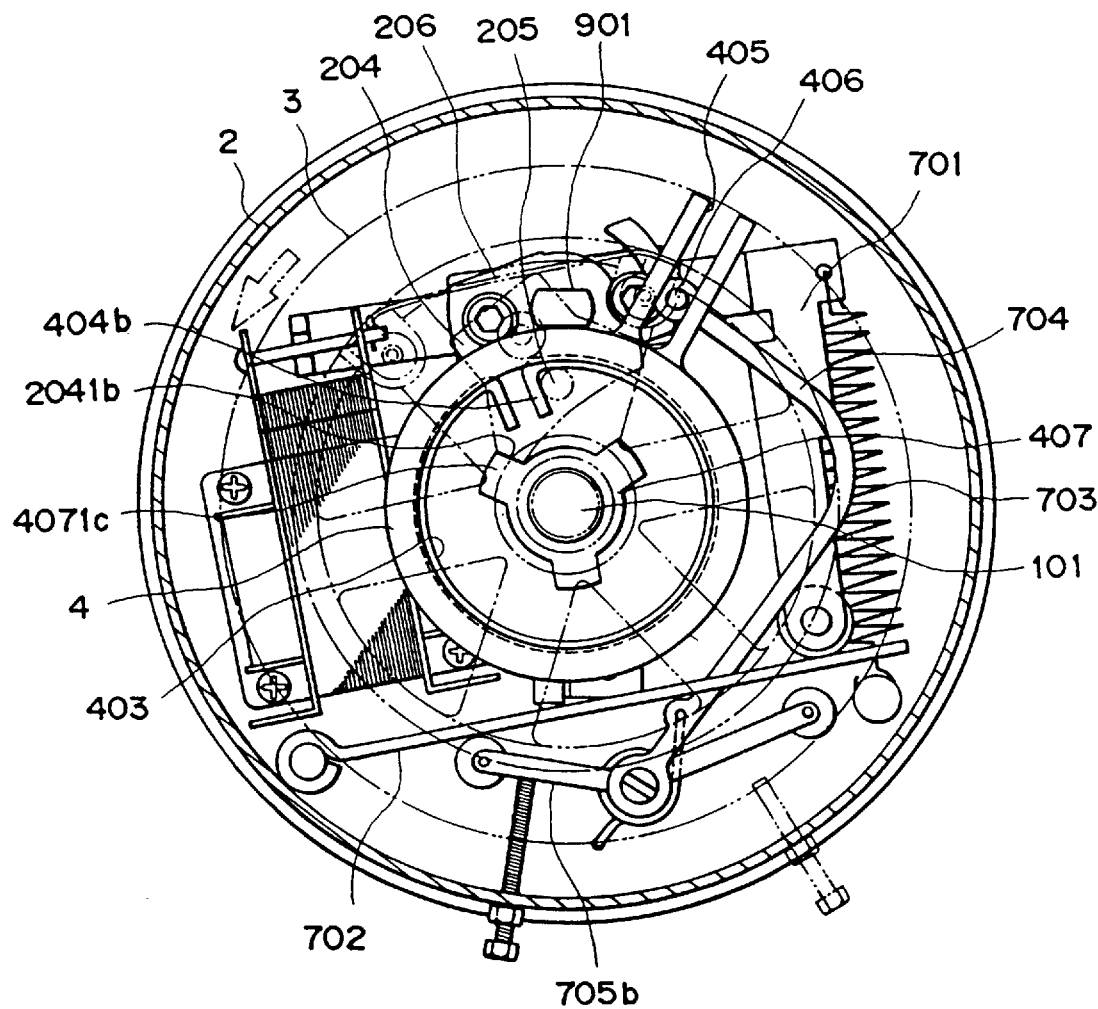
FIG. 5 is a cross sectional view showing the brake releasing state of the present invention, and for the purpose of clarity, parts of the members are indicated by dotted lines in order to distinguish different members.

The performance of the present invention without electricity is explained as below:

First based on the location for installing rolling door, the operation of the present invention is that, with reference to FIG. 2 for example, if the rolling door is opened by pulling downward the chain at the right side, then the chain duct 603 is fixed at the left outlet of the housing 2. Furthermore, as shown in FIG. 4, the screw rod 706 is screwed into the housing at the left wing plate 705b to push against the end surface of the plate 705b. Having mounted in this way, as shown in FIG. 5, if no electricity drives the motor 1, then the plunger 802 of the solenoid valve 801 is pulled out by spring 703 to swing the cam pin 901 for releasing the brake. During the situation of no electricity, when it is desired to open the door, if the operator pulls the right side chain 6 downward (with reference to FIG. 2), the chain sprocket 3 will then rotate clockwise. Please refer to FIG. 5, after the actuating pin 205 on the chain sprocket 3 follows the sprocket 3 to rotate, it will finally touch against the stopping arm 404b of the friction clamping ring 403 in intermediate dish 4. If the chain 6 is pulled continually, the intermediate disk 4 will be rotated by pushing the friction clamping ring 403. At this time, the triggering plate 204 on the chain sprocket 3 will counter against the leaf spring 206 to deflect counterclockwise around pin 203; and the long slide slot 405 which rotates with the intermediate 4 will drive the pin 406 accommodated therein to move radially outward. The brake releasing rod 704 integrated with the pin 406 is forced to swing clockwise around its axis, so as to make the wing plate 705b swing upward and push the intermediate lever 702 at the center part to swing upward counter clockwise around its axis, thus resisting against the spring 703 to move the actuating lever 701 upward, so the cam pin 901 turns counterclockwise to release the force which brakes the rotating shaft 101 of the motor.

Please refer to FIG. 5 again, when the cam pin 901 turns to the limit, and the rotation of the intermediate disk 4 is limited and can not rotate further. The rotation trend of the triggering plate 204 as well as that of the chain sprocket 3 are impeded. But if the pulling force is still increased, the clamping ring 403 will overcome the friction between the surfaces of ring groove and clamping ring and slide along the ring groove on the flange 402, while the triggering plate 204 will counter against the leaf spring 206 and deflect further. Also the branch arm 2041a of the triggering plate 204 will fall on a lug, for example the lug 4071b of the drive block 407 after rotating. Therefore, after the rotating shaft 101 is released as mentioned above, the rotating trend of the chain sprocket 3 pulled by the chain 6 will act upon the lug 4071b via branch arm 2041a to rotate the rotating shaft 101. Thus the rotating shaft 101 extended outward at the left end in FIG. 1 will rotate a conventional mechanism to wind up the door curtain. During pulling of the chain 6, if the operator stops pulling of the chain, the spring 703 of the brake assembly will then turn the cam pin 901 back, and the rotating shaft 101 is braked to remain therewith. Thereafter, if the operator pulls the chain 6 again, the processes described above will repeat therefrom to release the rotating shaft 101, actuate the drive block 407, turn the rotating shaft 101 and wind up the door curtain to open the door further. The above operations are the same as that of a conventional case. The improvements of the present invention will be described as below:

(1) During pulling of the chain 6 to wind up the door curtain, since the wing plate 705b pushes the intermediate lever 702 upward to press the actuating arm 1001 of the microswitch 10, so the current input to the motor 1 will be cut off. Therefore, even if the electricity is recovered again during pulling of the chain 6, the manual operation will not be interrupted.

(2) When the operator begins pulling the chain 6 to open the rolling door, as shown in FIG. 2 and FIG. 2-1, since the chain within the duct 603 at the left side of the sprocket 3 is clamped by the collect 605, only when the pulling force is large enough, the collect 605 can push the spring 604 upward within the duct 603. During pushing the spring 604 on, the diameter of the spring will gradually expand so as to loosen the collet 605 clamping the chain therein, thus the chain 6 can slide within the collet 605 freely. Since the operator must exert a large force to pull the chain down, at the beginning, the falling trend of the door curtain will be counteracted even the brake has been released. Inversely, if the operator stops pulling, the spring 604 will stretch immediately and reduce its diameter to clamp the chain again, so the chain will within such a short time move back and bring the sprocket 3 to rotate counterclockwise. At the same time, even if the deflected triggering plate 204 on the sprocket 3 can not recover due to the pressure of the leaf spring 206, the branch arm 2041a of the triggering plate 204 will be pushed through the lug 4071 to recover to the original position, and prepare stable operation for the next step.

If the other side of the chain 6 is pulled during opening of the door, the rotating direction of the interface wheel 4 will be clockwise and opposite to the above mentioned direction (please refer to FIG. 5), so the wing plate 705b will have the trend to rotate counterclockwise, but because of the screw rod 706 the wing plate 705b is blocked and can not rotate to release the rotating shaft 101, thus the door can not be opened unless the pulling direction is changed.

(3) The rotating shaft of the chain sprocket 3 is not the rotating shaft of the motor, therefore under the normal condition, the rotation of the motor will not transfer to the chain sprocket 3 so as to avoid the the vibration of the chain sprocket 3.

Summing up the above, the releasing of the brake of the rotating shaft and the rotating of the shaft to open the door can be done almost at the same time by means of the automatic clutch type chain pulling mechanism for a motor rolling door according to the present invention, the falling of the curtain of slates due to its own weight is thus prevented at the beginning of operation.

What I claimed is:

1. An automatic clutch type chain pulling mechanism for a motor rolling door mounted at one side of a motor and enclosed in a housing, said mechanism actuating a cam pin of a drum brake assembly which assembly is actuated during motor operation by a solenoid plunger of a solenoid to release the brake of the drum brake assembly so as to permit rotation of the motor shaft, said chain pulling mechanism comprising:

a releasing rod mechanism, an intermediate disk for actuating the releasing rod mechanism, and a chain sprocket rotatable by a chain for actuating said intermediate disk, wherein said chain sprocket is mounted for rotation on said housing.

2. An automatic clutch type chain pulling mechanism for a motor rolling door mounted at one side of a motor and enclosed in a housing, said mechanism actuating a cam pin of a drum brake assembly which assembly is actuated during motor operation by a solenoid plunger of a solenoid to release the brake of the drum brake assembly so as to permit rotation of the motor shaft, said chain pulling mechanism comprising:

a releasing rod mechanism, an intermediate disk for actuating the releasing rod mechanism, and a chain sprocket rotatable by a chain for actuating said intermediate disk, said chain having two ends extending from two sides of said housing, said releasing rod mechanism comprising an actuating lever having a first end functionally communicating with said cam pin, an intermediate lever having a first end pivotally fixed on said motor and a second end abutting a second end of said actuating lever, a brake releasing rod having a first end pivotally fixed on said motor below a central part of said intermediate lever, a pair of wing plates inclined upwardly to the intermediate lever and fixed on the first end of said brake releasing rod, a second end of said brake releasing rod having a pin arranged parallel to the rotating shaft of said motor, a biasing spring having a first end engaging said actuating lever and a second end fixed on said motor, wherein said intermediate disk has a central hole for rotatingly mounting said intermediate disk on the rotating shaft of said motor, a concentric raised circular flange provided on a side of said intermediate disk apart from said releasing rod mechanism and having a friction clamping ring inserted in a ring groove on an inner circumference of said flange, and an elongated slot radially arranged on the circumference of said intermediate disk for accommodating said pin on said brake releasing rod, said chain sprocket being rotatingly mounted on said housing and having a triggering plate actuated by a spring and pivotally mounted on a circumference of said chain sprocket, two branch arms being formed at two lower sides of said triggering plate and a protruding actuating pin being fixed at a lower middle portion of said triggering plate for actuating said friction clamping ring, and a drive block arranged in front of said circular flange of said intermediate disk fixedly mounted on the rotating shaft of said motor and having a plurality of lugs extending radially outwardly from a circumference of said drive block.

3. The automatic clutch type chain pulling mechanism for a motor rolling door according to claim 2, wherein a microswitch is further fixed above the intermediate lever and an actuating arm of the microswitch abuts against the intermediate lever.

4. The automatic clutch type chain pulling mechanism for a motor rolling door according to claim 2, wherein a roller is pivoted on each end of the two wing plates respectively.

5. The automatic clutch type chain pulling mechanism for a motor rolling door according to claim 2, wherein a screw hole for a screw rod to screw into is provided on the housing at a place which corresponds to each of the two wing plates respectively.

6. The automatic clutch type chain pulling mechanism for a motor rolling door according to claim 2, wherein a chain duct is fixed on one of the outlets of the housing and has a coil spring mounted therein, with the upper end of the spring being fixed on the duct and the lower end being bound on the circumference of a collet, the collet has a cross guide slot with smaller cross section than that of the chain, a plurality of slit slots are formed on the circumference of the collet radially without penetrating through the collet axially.

* * * * *